United States Patent [19]
Hahn et al.

[11] Patent Number: 4,634,334
[45] Date of Patent: Jan. 6, 1987

[54] VEHICLE RESTRAINT
[75] Inventors: Norbert Hahn, South Milwaukee, Wis.; Arthur A. Olson, Jr., Glenview, Ill.
[73] Assignee: Rite-Hite Corporation, Milwaukee, Wis.
[21] Appl. No.: 757,030
[22] Filed: Jul. 19, 1985
[51] Int. Cl.$^4$ .............................................. B65G 69/00
[52] U.S. Cl. ..................................... 414/401; 14/71.1
[58] Field of Search ....................... 414/401, 396, 584; 14/71.1; 188/2 F

[56] References Cited
U.S. PATENT DOCUMENTS

| 4,208,161 | 6/1980 | Hipp | 414/401 |
| 4,264,259 | 4/1981 | Hipp | 414/401 |
| 4,282,621 | 8/1981 | Anthony et al. | 414/401 |
| 4,373,847 | 2/1983 | Hipp et al. | 414/401 |
| 4,443,150 | 4/1984 | Hahn et al. | 414/401 |
| 4,555,211 | 11/1985 | Metz | 414/401 |
| 4,589,813 | 5/1986 | Hagen et al. | 414/401 |

Primary Examiner—Joseph E. Valenza
Assistant Examiner—Stuart J. Millman
Attorney, Agent, or Firm—Neuman, Williams, Anderson & Olson

[57] ABSTRACT

A vehicle restraint is provided with a releasable locking device for securing a parked vehicle adjacent a structure such as a loading dock. The device includes a first unit mounted adjacent to an upright surface of the structure and projecting outwardly therefrom. A second unit is mounted on the outwardly disposed distal end of the first unit for selective movement about an outwardly projecting axis between operative and inoperative modes. When in a operative mode, the second unit has at least a portion thereof projecting upwardly and assuming a vehicle interlocking position whereby a segment of the vehicle is entrapped between the upright portion of the second unit and the upright surface of the structure. When in an inoperative mode, the portion of the second unit assumes a vehicle release position disposed at a substantial angle relative to the upright vehicle interlocking position whereby the second unit will not obstruct movement of the vehicle away from the upright surface.

10 Claims, 9 Drawing Figures

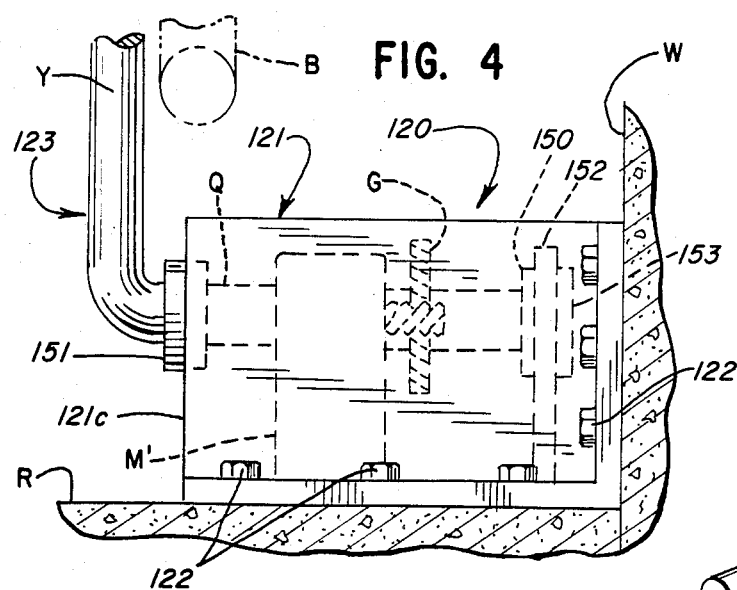
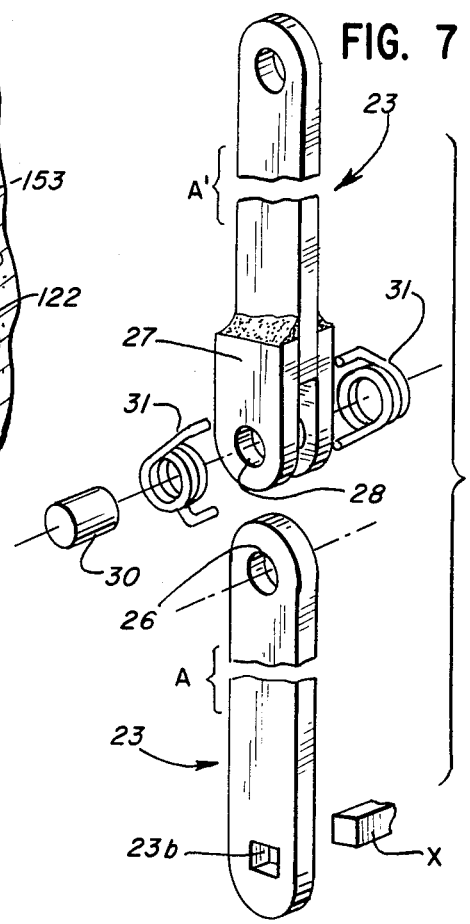
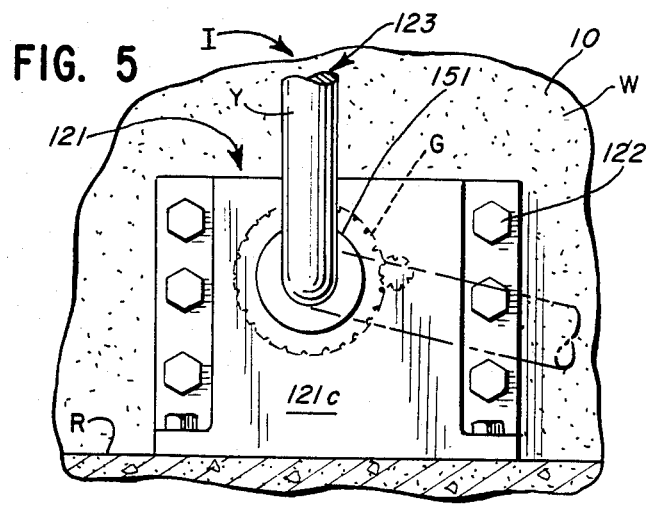
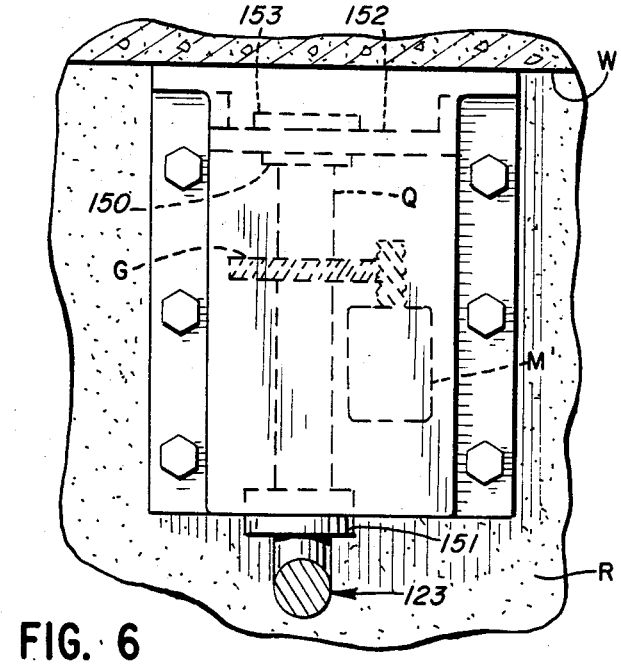
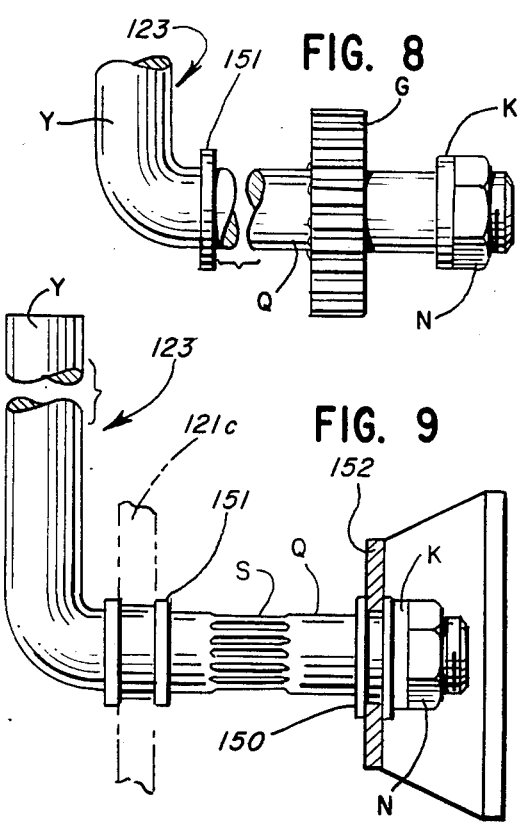

VEHICLE RESTRAINT

BACKGROUND OF THE INVENTION

In the loading and unloading of a vehicle parked at a loading dock, it is important from a safety standpoint that the truck or trailer bed thereof be held in position against the bumpers which are mounted on the front wall of the dock and be restrained from accidental or inadvertent movement away the dock front wall. Heretofore the truck or trailer was held in place by either (a) wheels chocks wedged in front of the rear set of wheels; (b) anchor chain or cable having one end thereof secured to the dock and the other end releasably attached to the rear of the truck or trailer; or (c) complex and costly devices which are difficult to install and frequently require substantial modifications being made to the dock and/or the road way on which the truck or trailer is parked. The latter devices are incapable of effectively securing vehicles wherein the ICC bars thereof vary in height and location over a wide range.

Wheel chocks are the most commonly employed because of their simplicity of design; however, they are susceptible to becoming lost or stolen; are ineffective where the roadway surface is slippery due to ice, water or oil drippings; and the proper positioning of the chocks relative to the rear set of wheels is normally the responsibility of the vehicle driver and is dependent upon the diligence and care exercised by the driver.

Because of the awkwardness and time required to properly attach and detach the chain or cable to or from the parked vehicle, they are oftentime disregarded by the driver or dock personnel and the driver instead relies solely on the braking capability of the truck or trailer itself to maintain the vehicle in place against the dock bumpers.

Some of the prior vehicle restraints require troughs or ditches to be formed in the roadway or require recesses or pockets to be formed in the dock wall in order to accommodate various components of the particular restraint. Thus, the installation costs are inordinately high and require defacement of either the roadway or dock wall. In other instances, some prior vehicle restraints require elaborate controls and various power sources to actuate the restraints which add significantly to the complexity and costs of the restraint. In still other prior vehicle restraints, they are susceptible to malfunction due to certain of the components thereof being exposed and adversely affected by severe climatic conditions.

SUMMARY OF THE INVENTION

Thus, it is an object of the invention to provide an improved vehicle restraint which avoids the aforenoted shortcomings associated with the prior restraints.

It is a further object to provide an improved vehicle restraint which has a low profile and is capable of accommodating loaded vehicles wherein the ICC bars thereof are disposed as low as 12 inches above the surface of the roadway.

It is a further object to provide an improved vehicle restraint wherein allowance for float of the vehicle during loading and unloading is not required.

It is a still further object to provide an improved vehicle restraint which will not interfere with the operation of a dock leveler even when the latter is in a below-dock mode and the vehicle is being end-loaded or unloaded.

It is a still further object to provide an improved vehicle restraint wherein the mechanism for effecting movement of the restraint into an operative mode is effectively protected against ice, snow, dirt and debris and is not readily susceptible to vandalism.

Further and additional objects will appear from the description, accompanying drawings and appended claims.

In accordance with one embodiment of the invention, a vehicle restraint is provided for securing a parked vehicle adjacent an upright wall of a loading dock. The device includes a first means which is mounted adjacent the dock wall and the roadway on which the vehicle is parked. The first means projects outwardly from the dock wall. A second means is mounted on an outer distal end of the first means for selective movement about an outwardly projecting axis between operative and inoperative modes. When the second means is in an operative mode, at least a portion thereof projects upwardly and assumes a vehicle interlocking position. When in a inoperative mode, the said portion of the second means assumes a vehicle release position which is disposed at a substantial angle with respect to the vehicle interlocking position and in a non-obstructing relation with respect to the parked vehicle. Third means associated with the first means selectively actuates the second means from the inoperative mode to the operative mode.

DESCRIPTION

For a more complete understanding of the invention, reference should be made to the drawings wherein:

FIG. 4 is similar to FIG. 1 but showing a second form of the improved vehicle restraint.

FIG. 5 is a fragmentary left end view of the restraint of FIG. 4.

FIG. 6 is similar to FIG. 3 but of the restraint of FIG. 4.

FIG. 7 is an enlarged perspective exploded view of a modified component of the restraint of FIG. 1.

FIGS. 8 and 9 are enlarged fragmentary side elevational views of two forms of a component for the restraint of FIG. 4.

Figure 1:
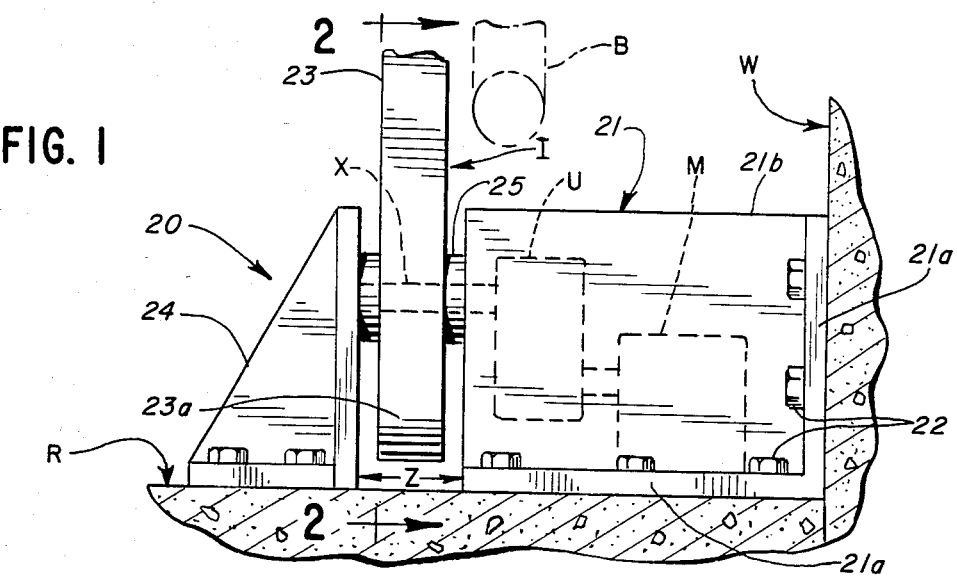
FIG. 1 is a fragmentary side elevation view of one form of the improved vehicle restraint showing the locking device thereof in a operative mode.
Figure 2:
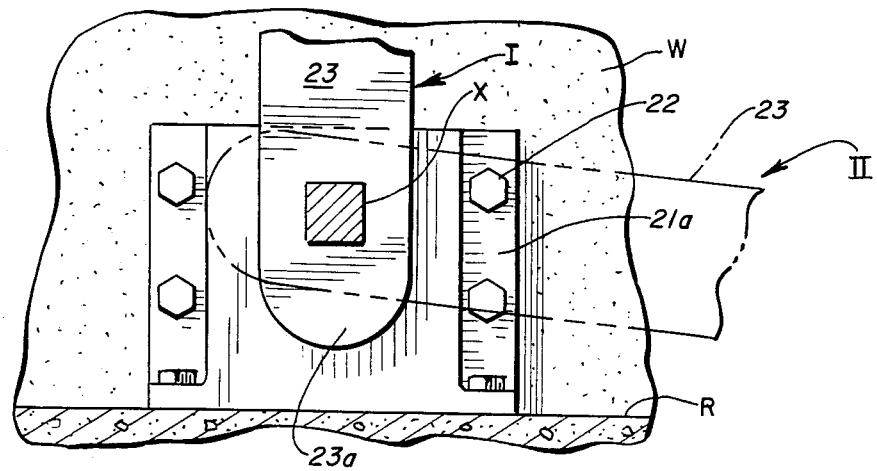
FIG. 2 is a fragmentary sectional view taken along line 2—2 of FIG. 1.
Figure 3:
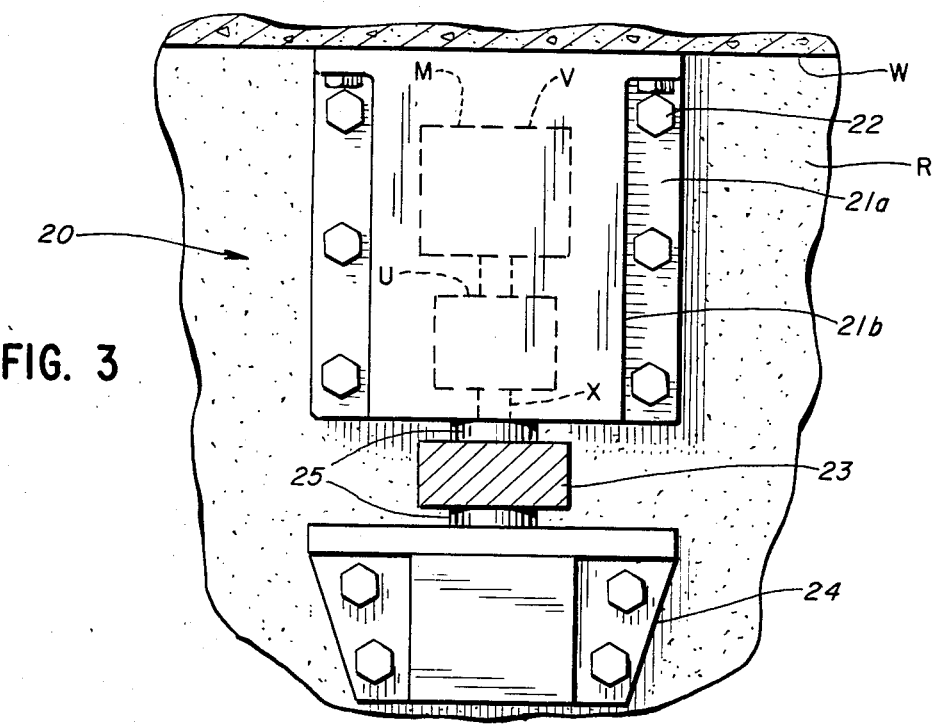
FIG. 3 is a fragmentary top view of the restraint shown in FIG. 1.

Referring now to the drawings and more particularly to FIGS. 1-3, one form of the improved vehicle restraint 20 is shown mounted on the front wall W of a loading dock and on the roadway R adjacent thereto. The restraint 20 includes an elongated first member 21 which is provided with a mounting flange 21a secured by a plurality of anchoring bolts 22 to the dock wall W and the roadway R. The mounting flange 21a projects outwardly from a protective shroud or housing 21b.

Rotatably mounted on the outer or distal end portion of the first member 21 is an elongated arm-like second member 23. Member 23 is adapted to be actuated by a drive motor M to rotate between an operative mode I and an inoperative mode II, see FIG. 2. The drive shaft of the motor is connected to a gear reduction unit U, which in turn is connected by a stub shaft X to the lower end portion of the arm-like member 23. The outer end of shaft X is supported in a journal bearing, not shown, formed in a bracket 24 disposed outwardly of member 23, see FIG. 1. The spacing Z between the outer end of member 21 and bracket 24 is of such dimension as to allow the lower end portion 23a of member 23 and a pair of spacer washers 25 to fit therebetween.

Drive motor M is preferably of a reversible type and is connected by suitable wiring V to conventional push-button controls, not shown, which are normally located inside the plant or warehouse provided with the loading dock. Such controls are situated adjacent the doorway served by the loading dock and are under the control of loading dock personnel. Audio and visual warning signals, not shown, are mounted on the exterior of the plant or warehouse to alert the vehicle driver as to whether the restraint is in the operative vehicle-locking mode I or in the inoperative vehicle-release mode II. Similar signals are provided adjacent the push-button controls so as to alert the dock personnel as to when conditions are safe for loading or unloading the parked vehicle.

First member 21 has a low profile and the upper surface of the shroud 21b has a preferred elevation relative to the roadway of between 10" to 12". The arm-like member 23 is set out from the dock wall W approximately 13". Where the vehicle restraint is used in conjunction with a dock leveler or end of dock ramp, neither of which is shown, the distance the member 23 is set out from the dock wall will depend upon the extent to which the lip plate or ramp projects from the wall when it is engaging the bed of the parked vehicle. Normally, the lip plate will project outwardly about 16". Thus, arm-like member 23, when in an operative mode, will restrain the parked vehicle, during loading and unloading from accidentally or inadvertently moving away from the dock wall an amount which will cause the lip plate or ramp from becoming disengaged from the vehicle bed. When the lip plate or ramp becomes disengaged from the truck or trailer bed, the dock leveler to which it is connected, is unsupported at its outer end causing the deck of the dock leveler to suddenly pivot downwardly. If a forklift truck, a cart, the loaded or unloaded product, or dock personnel is disposed on the deck at the time the lip plate or ramp becomes disengaged, serious injury to the personnel and damage to the product and handling equipment will result.

Once the parked vehicle is properly positioned with respect to the dock wall W, the depending ICC bar B carried on the rear of the truck or trailer bed, will become entrapped between the dock wall W and the arm-like member 23, when the latter assumes the operative mode I, see FIG. 1.

The length of member 23 may vary as desired, but it is preferred that it project approximately 22"-24" above the top surface of the shroud or housing 21b, when the arm-like member 23 is in the operative mode. It has been found that with most trucks and semi-trailer trucks, the height of the ICC bar B above the roadway will vary from a minimum of about 15" to a maximum of about 30" and will experience a normal float of approximately 2"-3" in either direction during the loading or unloading operation. Because of the low profile of the shroud 21b and the length of arm-like member 23, the problem of float is of no concern as the ICC bar B is free to move vertically relative to member 23 when the latter is in the operative mode I.

In order to avoid the possibility that the member 23 will engage some obstruction located on the underside of the bed of the parked vehicle and thus, not properly assume its operative mode position, member 23 may be formed of a plurality of interconnected sections A and A', only two being shown in FIG. 7. Section A, which is connected directly to stub shaft X, has an opening 26 formed in the free end thereof. The free end is accommodated by a bifurcated end 27 of section A' which also is provided with openings 28. When the sections are assembled, openings 26 and 28 are in alignment and accommodate a connecting pin 30. The sections A and A' are adapted to normally assume a straight-line or aligned relation by one or more biasing springs 31.

As member 23 pivots between operative and inoperative modes, the section A' of member 23 may pivot in either direction relative to section A, if section A' should meet an obstruction and thus, permit section A to continue its pivotal movement to the desired mode. It should be noted that the pivot axis between sections A and A', defined by connecting pin 30, is substantially parallel to the pivot axis of member 23, defined by stub shaft X. Both axes are perpendicular to the dock wall W and thus, the sections A and A' will not pivot relative to one another when subjected to an outward, pulling force by the entrapped ICC bar B.

The number and shape of the sections comprising the member 23 may vary from that shown, if desired.

A second form 120 of the improved vehicle restraint is shown in FIGS. 4-6. Components thereof which are similar to those of restraint 20 will be identified by like numerals, but in the one hundred series. Restraint 120 includes an elongated, low profile, first member 121 which is secured to the dock wall W and roadway R by a plurality of anchor bolts 122. Member 121 includes a shroud or housing 121a, the height and length dimensions of which are substantially the same as those of shroud 21a; namely 10"-12" height and approximately 13" length.

An L-shaped second member 123 is provided which is supported by the first member 121 and is adapted to pivot about one leg Q thereof as an axis between operative and inoperative modes. The second leg Y of member 123 projects laterally from the outer end of member 121, see FIG. 4.

Disposed within shroud 121a of member 121 is a drive motor M' which has the drive shaft thereof in meshing engagement with a gear G carried on the leg Q of the L-shaped member 123. The gear G is disposed within shroud 121a and is located between a pair of support bearings 150 and 151. Bearing 150 is mounted within an opening formed in an upright partition 152 which in turn is disposed in spaced substantially parallel proximate relation with respect to dock wall W. Bearing 151, on the other hand, is mounted within an opening formed in the end wall 121c of shroud 121.

The inner end of the leg Q of member 123 has affixed thereto an enlarged end piece 153 which is disposed between partition 152 and the dock wall W. The end piece 153 may comprise a washer or collar K which is held in place on the leg Q by a lock nut or bolt N, see FIGS. 8 and 9.

The L-shaped member 123, shown in FIG. 8 is substantially the same configuration as member 123, shown in FIG. 9 except in the latter version splines S in the leg Q have been substituted for the gear G. Accordingly, a worm gear, not shown, connected to the drive shaft of motor M' meshes with the splines so as to control the rotation of leg Y about leg Q as an axis.

The Y leg of member 123 may comprise a plurality of sections, not shown, which are pivotally connected to one another in a manner similar to that shown in FIG. 7.

While in both vehicle restraints 20 and 120 the arm-like member 23 and 123 is pivoted between operative and inoperative modes by an electric motor M or M', hydraulic and pneumatic power sources may be utilized for this purpose. In some instances, manual effort may be utilized to actuate member 23 or 123. When the member 23 or 123 is in an operative mode, it assumes a vertical or 12 o'clock position and, when it is in an inoperative mode, it assumes a substantially horizontal or 3 o'clock position or a downwardly inclined position, so that the member 23 or 123 will not obstruct movement of the vehicle toward or away from the dock wall W.

While the first member 21 or 121 is shown anchored to both the roadway and dock wall, attachment to only one of these surfaces may be sufficient in some installations.

Thus, an improved vehicle restraint has been disclosed which is of simple, yet sturdy construction, is easy to install and can be utilized with or without a dock leveler. Furthermore, the improved vehicle restraint can readily accommodate trucks or trailers where the ICC bars thereof may vary in height and location over a wide range. Because of the shroud or housing having a low profile and the effective length of the arm-like member being substantial, the matter of float of the ICC bar during loading and unloading operation is of no concern. The improved vehicle restraint, when in the inoperative mode, is not susceptible to being struck by a backing truck or trailer. The shroud 21 or 121 provides protection for the motor and gears against snow, ice, dirt and debris. The improved vehicle restraint does not interfere with any of the dock leveler components when the dock leveler is disposed in a below level position during end loading or unloading of the vehicle.

The size and shape of the various components comprising the improved vehicle restraint may be varied from that shown without departing from the scope of the claimed invention.

We claim:

1. A releasable locking device for securing a parked vehicle in close proximity to an upright surface of an adjacent structure, said device comprising a first means mountable adjacent the structure upright surface and being adapted to project outwardly therefrom; second means mounted on an outwardly disposed distal end portion of said first means for selective movement between operative and inoperative modes about an axis adapted to project angularly outwardly from the upright surface, said axis remaining in an outwardly projecting position, when said second means is in either of said modes, when in said operative mode, said second means having at least a portion thereof assuming a vehicle interlocking upright position, and when in an inoperative mode, the said second means portion assuming a vehicle release position disposed at a substantial angle relative to said upright position and in a non-obstructing relation with the parked vehicle; and third means associated with said first means for selectively actuating said second means from said inoperative mode to said operative mode.

2. The releasable locking device of claim 1 wherein the second means rotates about the outwardly projecting axis through a predetermined sector of a circle.

3. The releasable locking device of claim 2 wherein the sector is at least about 90°.

4. The releasable locking device of claim 1 wherein the outwardly projecting axis of said second means is adapted to be disposed adjacent a surface in supporting subtending relation with the parked vehicle.

5. The releasable locking device of claim 1 wherein said third means includes a drive motor mounted on said first means and operatively connected to said second means.

6. The releasable locking device of claim 1 wherein said second means includes a plurality of elongated sections hingedly connected to one another and adapted to normally assume an aligned relation; the axis of each hinge connection being substantially parallel to the axis of movement of said second means.

7. The releasable locking device of claim 1 wherein the second means has an L-shaped configuration with one leg thereof defining the axis of selective movement, said one leg being supported by said first means whereby a second leg of the L-shaped second means rotates between said operative and inoperative modes within a substantially vertical plane located outwardly a substantially fixed distance from the upright surface.

8. The releasable locking device of claim 7 wherein the one leg of the L-shaped second means is provided with a drive component, and the third means is provided with a complemental drive component, said drive components coacting to effect selective movement of the second means about said one leg as an axis.

9. The releasable locking device of claim 1 wherein the first means assumes a substantially stationary position relative to the upright surface of the adjacent structure and a second surface in supporting subtending relation with the parked vehicle; when in an inoperative mode, the vehicle engaging portion of the second means assumes relative to the second surface a downwardly inclined vehicle release position.

10. The releasable locking device of claim 1 wherein the third means includes a reversible drive motor and gear reducing means connected thereto, both said motor and reducing means substantially enclosed within a shroud of the first means and disposed between said second means and the upright surface of the adjacent structure, said gear reducing means having drive means engaging said second means and defining the axis of rotation thereof, and bearing means spaced outwardly from said second means and supportingly engaging the drive means of said gear reducing means.

* * * * *